United States Patent [19]
Ohta et al.

[11] Patent Number: 5,453,884
[45] Date of Patent: Sep. 26, 1995

[54] MAGNETO-OPTICAL RECORDING MEDIUM

[75] Inventors: Kenji Ohta, Kitakatsuragi; Junichiro Nakayama; Hiroyuki Katayama, both of Nara, all of Japan

[73] Assignee: Sharp Kabushiki Kaisha, Osaka, Japan

[21] Appl. No.: 272,273

[22] Filed: Jul. 8, 1994

Related U.S. Application Data

[63] Continuation of Ser. No. 654,319, Feb. 12, 1991, abandoned.

[30] Foreign Application Priority Data

Feb. 23, 1990 [JP] Japan ..................................... 2-43944

[51] Int. Cl.$^6$ .............................. G11B 11/00; G11B 5/72
[52] U.S. Cl. ............................. 369/13; 428/695; 428/900
[58] Field of Search ..................................... 369/13, 295.1, 369/272, 283, 286, 283, 286; 360/59, 114, 134, 135, 75, 103; 428/900, 695, 694, 447

[56] References Cited

U.S. PATENT DOCUMENTS

| | | | |
|---|---|---|---|
| 4,188,434 | 2/1980 | Loran | 360/134 X |
| 4,689,254 | 8/1987 | Arndt et al. | 428/695 |
| 4,849,305 | 7/1989 | Yanagisawa | 428/695 |
| 4,871,625 | 10/1989 | Dekura et al. | 428/695 |
| 4,889,757 | 12/1989 | Horigome et al. | 428/695 X |
| 4,897,320 | 1/1990 | Nomura et al. | 369/13 X |
| 4,931,887 | 6/1990 | Hegde et al. | 360/103 |
| 4,975,322 | 12/1990 | Hideyama et al. | 428/695 X |
| 5,030,480 | 7/1991 | Roze et al. | 428/695 X |

FOREIGN PATENT DOCUMENTS

| | | |
|---|---|---|
| 0295813 | 12/1988 | European Pat. Off. . |
| 0332784 | 9/1989 | European Pat. Off. . |
| 63-10357 | 1/1988 | Japan . |
| 2-203418 | 8/1990 | Japan . |

OTHER PUBLICATIONS

"High Speed Overwritable Magneto-Optic Recording" Proceedings of the International Symposium on Optical Memory, 1987/Japanese J. of App. Phy. vol. 26 (1987) Supplement 26-4.

Japanese Publication for unexamined Patent application No. 98857/1988 (Tokukaisho 63-98857).

"Crash Prevention for Magnetic Storage Devices" Jan. 1987/Mechanical Engineering.

Japanese Patent Application No. 323322/1989 (Date of filing: Dec. 12, 1989).

U.S. Patent Application, Ser. No. 07/633,406, filed: Dec. 21, 1990, Inventor: J. Kaisha.

U.S. Patent Application Ser. No. 07/650,283 filed: Feb. 4, 1991 Inventor: Nakayama "Magnetic Recording, vol. II: Computer Data Storage," (C. Denis Mee et al., McGraw-Hill, 1987, New York, pp. 19–131; 336–353).

*Primary Examiner*—Stuart S. Levy
*Assistant Examiner*—George J. Letscher
*Attorney, Agent, or Firm*—David G. Conlin; George W. Neuner; Brian Michaelis

[57] ABSTRACT

A magneto-optical disk having a magnetic layer and a conductive layer laminated on a transparent substrate, and having a lubricant layer provided on the conductive layer. Recording and reproduction on and from the magneto-optical disk are performed by a flying head. The flying head glides above and lands on the lubricant layer. The magneto-optical disk can therefore be removed from the device easily since a magnetic head does not adhere to a recording medium. Further, a depressing force exerted on the flying head is controlled so as to maintain a constant floating gap between the flying head and the recording medium. The depressing force is controlled by electrostatic capacity between an electrode, provided on a bottom face of the flying head, and the conductive layer. Consequently, highly reliable recordings can be made since a magnetic field intensity applied to the magnetic layer becomes constant. It is desirable that the lubricant layer be composed of an organic binder containing a powder belonging to the ethylene tetrafluoride resin family.

6 Claims, 2 Drawing Sheets

MAGNETO-OPTICAL RECORDING MEDIUM

This is a continuation of application Ser. No. 07/654,319 filed on Feb. 12, 1991, now abandoned.

FIELD OF THE INVENTION

The present invention relates to a magneto-optical recording medium whereon recording is carried out or wherefrom reproduction or erasing is carried out according to the magneto-optical effect.

BACKGROUND OF THE INVENTION

Technical advances in creating high-density and large memory capacity magneto-optical disks whereon recorded information can be re-written are attracting considerable attention. In particular, research aimed at improving the transfer rate of data in magneto-optical disks capable of overwrite (wherein erasing operation is unnecessary) is being viewed with interest. As a method of recording information onto magneto-optical disks based on the overwrite method, using a magnetic field modulation flying head is regarded as the most effective method. In this method, a magnetic head is attached to a slider and the slider glides above a magneto-optical disk due to high rotation speed of the magneto-optical disk. Recording is carried out on the magneto-optical disk by modulation of a magnetic field generated by the magnetic head (see T. Nakao, M. Ojima, T. Miyamura, S. Okamine, H. Sukeda, N. Ohta and Y. Takeuchi, Jpn. J. Appl. Phys., Vol. 26, (1987) Suppl. 26-4, pp. 147–154).

In a flying head, a floating gap between the magnetic head and the magneto-optical disk is kept constant by dynamically balancing a floating force with a depressing force. The floating force is the force exerted upwards on the slider due to an air flow between the magneto-optical disk and the slider bearing the magnetic head. The depressing force is the force exerted downwards on the slider by a supporting mechanism that holds the slider.

However, the floating gap changes substantially due to changes in the rotation speed of the magneto-optical disk or due to changes in the depressing force exerted by the supporting mechanism. For example, when the magneto-optical disk is rotated at a constant high velocity in CAV (Constant Angular Velocity) mode, linear velocity varies depending on a radial position on the magneto-optical disk. If the depressing force exerted on the magnetic head is constant, the floating gap changes depending on the radial position, i.e., the floating gap becomes progressively smaller as the slider approaches the inner section of the magneto-optical disk. Further, in the case where a substrate of the magneto-optical disk is made of plastic, the floating gap changes due to warping or undulation of the substrate since the magnetic head does not follow the warping or undulation.

When the floating gap changes, the intensity of the magnetic field applied to a recording film of the magneto-optical disk by the magnetic head also changes. As a result, when the applied magnetic field is too weak, information cannot be recorded in a desired recording area with certainty (unsaturated recording). On the other hand, when the applied magnetic field is too strong, information also gets recorded in areas other than the desired recording area. Consequently, recorded bit shapes become uneven and signal quality of recorded signals deteriorates.

In order to resolve this problem, patent applications have been filed in the Japanese Patent and Trademark Office, such as Patent Application No. 323322/1989 (Tokuganhei 1-323322). In this patent application, a magnetic recording/reproducing device that uses a magneto-optical disk provided with a conductive film is disclosed. An electrode is provided on a bottom face of a slider. Electrostatic capacity between the electrode and the conductive film of the magneto-optical disk is detected. The intensity of a magnetic field generated by a magnetic head is controlled so as to keep the floating gap constant according to the detected electrostatic capacity. That is, a depressing force exerted on the slider by the magnetic head supporting mechanism, or an electric current applied to the magnetic head is controlled so as to keep the floating gap constant according to the detected electrostatic capacity. Information is thus recorded on the magneto-optical disk by controlling the intensity of the magnetic field generated by the magnetic head.

However, in the magnetic recording/reproducing device that uses the magneto-optical disk provided with the conductive film, the so-called contact-start-stop method cannot be used. In the contact-start-stop method, the magnetic head is in contact with a surface of the magneto-optical disk when rotation of the magneto-optical disk is started or stopped and this method cannot be used here because the surface of the magneto-optical disk having the conductive film is coarse and has poor lubricity and, as a result, the magnetic head adheres to the surface of the disk. As a consequence, problems arise that disk rotation does not begin and that the disk gets stuck in the device and cannot be removed.

Meanwhile, a magneto-optical disk provided with a lubricant has been disclosed in Japanese Patent Laid-Open Publication No. 98857/1988 (see Tokukaisho 63-98857). However, since the lubricant in this case is in an oily state (liquid state), adherence occurs as described above between the magnetic head and the disk, and the lubricant is scattered when the magneto-optical disk is rotated at high speed.

It is an outstanding characteristic of the magneto-optical disk that it is freely removable from and insertable into the device, and in this respect it is superior to fixed-type magnetic disks such as hard disks. However, when a rotating magneto-optical disk is stopped and an attempt made to remove it from the device, it becomes impossible to do so if the magnetic head adheres as described above to the surface of the disk. Moreover, magneto-optical disks using a lubricant in an oily state also have the problem that dust accumulates easily thereon.

SUMMARY OF THE INVENTION

It is an object of the present invention to record and reproduce information on or from a magneto-optical recording medium under constant conditions without causing adhesion of a flying magnetic head with the magneto-optical recording medium and without causing dust to accumulate thereon.

In order to attain the above object, a magneto-optical recording medium related to the present invention includes a magnetic layer, a conductive layer laminated on a transparent substrate and a lubricant layer on the conductive layer.

According to the above arrangement, the magneto-optical recording medium can be removed from the device easily without a flying head adhering to the recording medium. This is because the flying head glides above and lands on a surface of the lubricant layer provided on the recording medium. Moreover, if a flying head provided with an electrode on a bottom face thereof is used, a floating gap between the flying head and the magneto-optical recording medium can be controlled to remain constant according to electrostatic capacity between the electrode and the conductive layer. Stable recording of information can therefore be carried out on the magnetic layer.

It is desirable that the lubricant layer be composed of an organic binder containing a powder belonging to the ethylene tetrafluoride resin family. In such a case, the magnetic head does not adhere to the recording medium, the lubricant is not scattered even when the recording medium is rotated at high speed and accumulation of dust on the recording medium is minimized.

Further, it is desirable that the magnetic layer be tightly sealed by the conductive layer so as not to be exposed to air. In such a case, the magnetic layer and the conductive layer need not be formed in an area on the magneto-optical recording medium where the flying head comes in contact with the magneto-optical recording medium when started or stopped. According to the above arrangement, reliability improves since the magnetic layer does not corrode.

For a fuller understanding of the nature and advantages of the invention, reference should be made to the ensuing detailed description taken in conjunction with the accompanying drawings.

DESCRIPTION OF THE EMBODIMENTS

A detailed description of the present invention follows, referring to FIGS. 1 to 4.

A first embodiment of the present invention is described hereinbelow referring to FIGS. 1 and 4.

Figure 1:
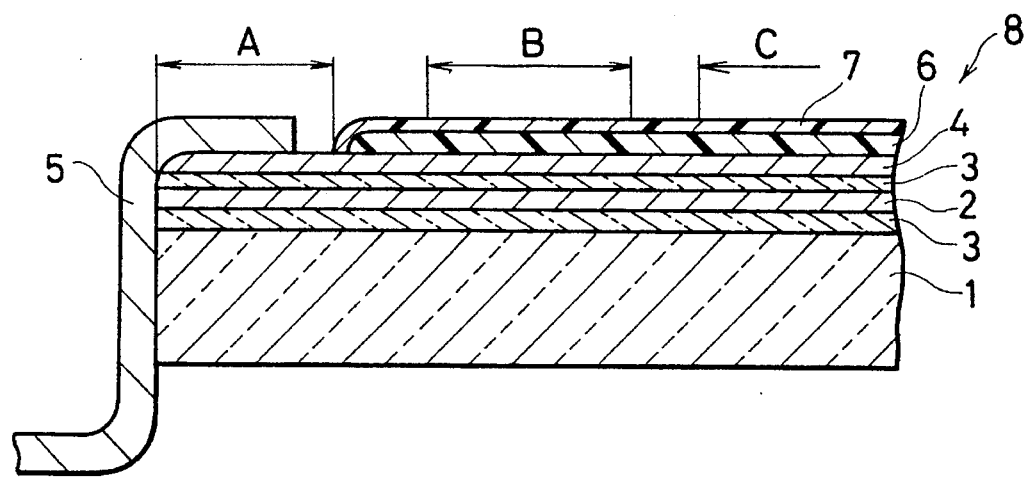
FIG. 1 shows a first embodiment of the present invention and is a partially sectional enlarged view of a magneto-optical disk.

As shown in FIG. 1, a magneto-optical disk 8 (magneto-optical recording medium) related to the present invention is laminated in sequence on a transparent substrate 1 made of glass or PC (polycarbonate) or other material. The magneto-optical disk 8 is laminated with a transparent dielectric film 3 made of AlN, SiN etc., a magnetic film 2 (magnetic layer) made of rare-earth transition metals such as GdTbFe, DyFeCo, TbFeCo etc., a transparent dielectric film 3 and a reflecting film 4 made of Al etc..

Moreover, in a section excluding the innermost section (shown by A in FIG. 1) of the reflecting film 4, a resin layer 6 and a lubricant layer 7 to be described later are laminated in sequence. The resin layer 6 is made of an ultraviolet hardening-type resin belonging to the urethane acrylate family. Further, a metallic ring-shaped hub 5 is fixed in a circular-shaped center hole opened in the center of the magneto-optical disk 8. The hub 5 is joined using a conductive adhesive to the reflecting film 4 that functions as a conductive layer.

The resin layer 6 has a thickness in the range of 2 µm–20 µm. Further, the lubricant layer 7 is formed as follows. A mixture of an organic binder and a powder of low molecular weight, belonging to the ethylene tetrafluoride resin family (particle size 0.1 µm–0.5 µm) is formed. The mixture is dissolved in an organic solution (such as Lubron produced by Daikin Industries) and is applied thinly to the resin layer 6 to a thickness of 1 µm–5 µm by means of the spray method, the spinner method or other method. As a result, the resin layer 6 becomes highly lubricous.

Since the main component of the powder belonging to the tetrafluoride ethylene resin family is expressed by the chemical formula $-(CF_2-CF_2)_n-$, the powder is in a solid state at room temperature and the coefficient of static friction with respect to the magnetic head remains not more than 0.5. In order to remove the magneto-optical disk 8 from the device without adhesion to the magnetic head it is necessary that the coefficient of static friction be not more than 0.4.

According to the above arrangement, when recording is performed on the magneto-optical disk 8 by the flying head (see FIG. 4), a zone indicated by B in FIG. 1 becomes a contact-start-stop-zone. In other words, the flying head respectively glides above and rests on the zone indicated by B provided on the lubricant layer 7, when rotation is started and stopped.

When the magneto-optical disk 8 is rotated at high speed, there is no scattering of the lubricant since the lubricant layer 7 is unlike a lubricant belonging to the perfluoroether family in that the lubricant layer 7 is not in a liquid state (oily state). Further, the magneto-optical disk 8 can be removed easily from the magnetic recording/reproducing device since the magnetic head does not adhere to the magneto-optical disk due to the lubricant layer 7 provided thereon. There are other advantages as well such as reduced accumulation of dust on the surface of the magneto-optical disk 8.

Figure 4:
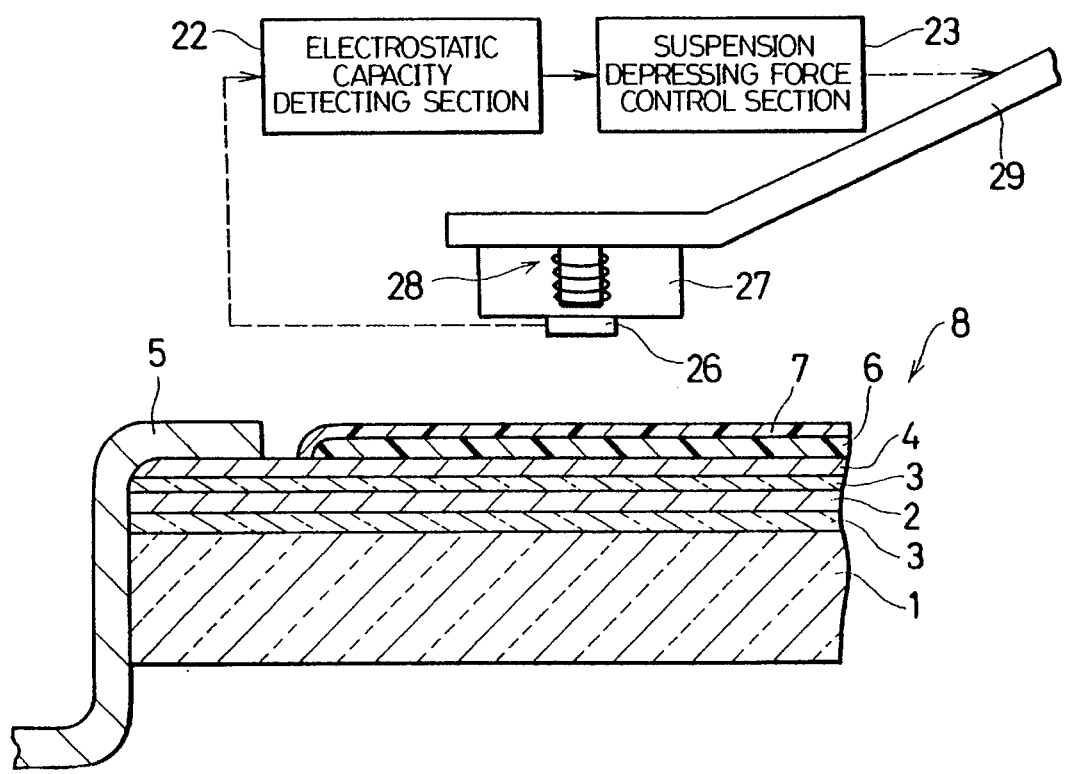
FIG. 4 is an explanatory view showing a state wherein a flying head is gliding above the magneto-optical disk of the first embodiment.

Referring to FIG. 4, a description follows of recording performed on the magneto-optical disk 8 having an arrangement as described above. The recording is performed in a zone indicated by C in FIG. 1 by the magnetic recording/reproducing device and based on the magnetic field modulation method.

As shown as an example in FIG. 4, the magnetic recording/reproducing device comprises a flying head and a suspension 29 that supports the flying head. The flying head includes a magnetic head 28 that generates a magnetic field, a slider 27 that bears the magnetic head 28 and an electrode 26. The electrode 26 is provided on a bottom face of the slider 27 so as to be opposing to the magneto-optical disk 8 and so as to partially or fully cover the bottom face of the slider 27.

When the magneto-optical disk 8 is placed in the magnetic recording/reproducing device, the hub 5 comes in contact with a metallic spindle shaft (not shown) that rotates the magneto-optical disk 8. The hub 5 comes in contact with the reflecting film 4 having low conductivity and is grounded as is the spindle shaft. Thus, a sort of capacitor is formed by the reflecting film 4 of the magneto-optical disk 8 and the electrode 26 provided on the flying head.

Electrostatic capacity between the reflecting film 4 and the electrode 26 is detected by an electrostatic capacity detecting section 22. A change in electrostatic capacity corresponds to a change in a floating gap between the slider 27 (the electrode 26) and the magneto-optical disk 8. That is to say, the floating gap can be specified by detecting the electrostatic capacity since the electrostatic capacity is inversely proportional to a distance between the electrode 26 and the magneto-optical disk 8.

For example, when an electrostatic capacity detected by the electrostatic capacity detecting section 22 is greater than a reference capacity, the floating gap is smaller than a reference gap. Therefore, in order to increase the floating gap, the distance between the magnetic head 28 and the lubricant layer 7 is increased by reducing a depressing force exerted by the suspension 29 according to a suspension depressing force control section 23. On the other hand, when the electrostatic capacity detected by the electrostatic capacity detecting section 22 is smaller than the reference capacity, the floating gap is greater than the reference gap. Therefore, in order to decrease the floating gap, the distance between the magnetic head 28 and the lubricant layer 7 is decreased by increasing the depressing force exerted by the suspension 29 according to the suspension depressing force control section 23.

As described above, the floating gap is kept constant according to the suspension depressing force control section 23 that controls the depressing force exerted on the slider by the suspension 29, according to an output of the electrostatic capacity detecting section 22. Consequently, unsaturated recording or unevenness of recorded bit shapes caused due to variations in magnetic field intensity is eliminated since the magnetic field applied to the magnetic film 2 is kept constant. Thus, using the magnetic head 28 reliable high speed recording can be carried out. Further, the magnetic field applied to the magnetic film 2 can be kept constant by controlling an applied electric-current for driving the magnetic head 28, instead of by controlling the depressing force.

Regarding the joining of the hub 5 and the reflecting film 4, a conductive adhesive belonging to the epoxy resin family that has a conductive additive agent mixed therein may be used. Alternatively, the conductive adhesive may be applied at parts and some other adhesive used for joining the remaining major portion to be joined.

Further, apart from material described earlier, material used for the substrate 1 may equally be a resin belonging to the acrylic, epoxy or olefin family.

If the dielectric film 3 is transparent, other materials such as $SiO_2$, $Al_2O_3$, SiNH, SiNCH may be used. Further, the dielectric film 3 can be dispensed with.

A rare-earth transition metal thin film such as GdDyFe, TbCo, GdTbDyFe, GdTbFeCo etc., apart from the above mentioned materials, may be used as the magnetic film 2. A rare-earth transition metal thin film wherein Co,Cu, Ti, etc. are contained may equally be used. A multi-layered film having Pt and Co added to the thin film may equally be used.

Au, Ag, Cu, stainless, Ti etc. may be used, apart from Al, as the reflecting film 4.

Although in the present embodiment the resin layer 6 and the lubricant layer 7 have been described as two layers, a single layer performing the functions of the two layers may equally be used.

Figure 2:
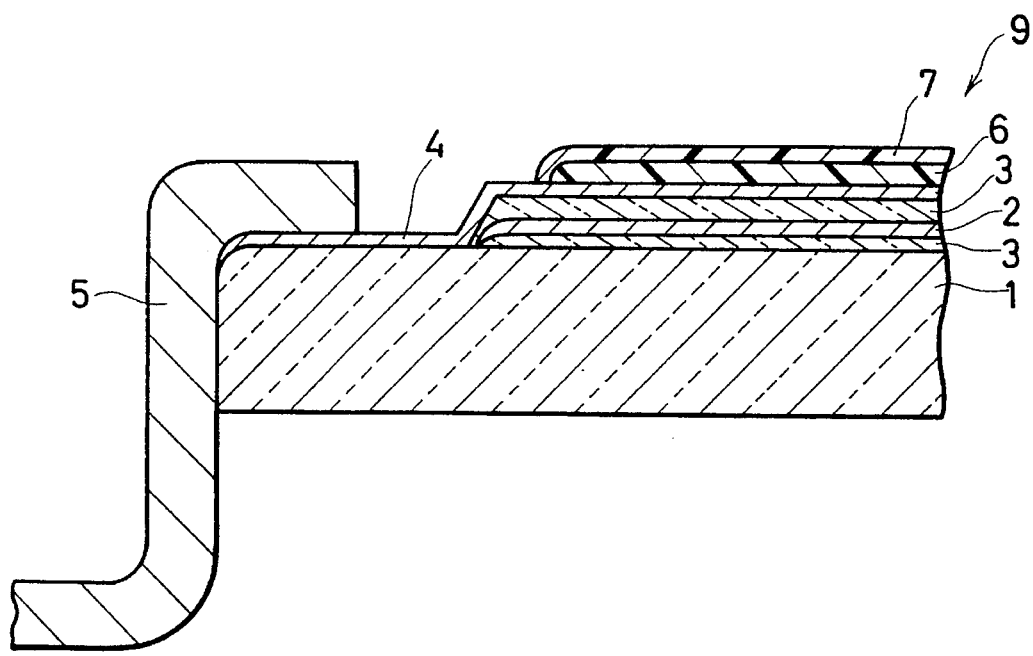
FIG. 2 shows a second embodiment of the present invention and is a partially sectional enlarged view of a magneto-optical disk.

A second embodiment of the present invention is described hereinbelow, referring to FIG. 2. Here, members having the same functions as the members of the first embodiment are referred to with the same reference numbers and their explanation is omitted.

A magneto-optical disk 9 of the present embodiment has dielectric films 3 and a magnetic film 2 provided on a section excluding the inner section of a substrate 1. Above these, a reflecting film 4, a resin layer 6 and a lubricant layer 7 are laminated as described in the first embodiment. A hub 5 is fitted in a center hole that is provided in the inner section and the hub 5 is adhered to the reflecting film 4.

According to the above arrangement, the magneto-optical disk 9, placed in a magnetic recording/reproducing device (not shown) can be removed easily from the device. This is because a flying head does not adhere to the surface of the magneto-optical disk 9 due to the lubricant layer 7 provided thereon. Thus, stable recording can be carried out on the magneto-optical disk 9 using the same method as employed in the first embodiment.

Corrosion of the magnetic film 2 is prevented since the reflecting film 4 seals the magnetic film 2 and so prevents exposure of the magnetic film 2 to air in the inner section where the center hole is provided. In the first embodiment, however, the magnetic film 2 remains exposed to air in the inner section where the center hole is provided. Further, the magnetic film 2 and the dielectric films 3 may be provided up to the vicinity of the inner-most section of the magneto-optical disk 9, if the arrangement is such that the reflecting film 4 seals the magnetic film 2 from direct exposure to air. In this case, stable recording can be carried out in the same way as in the first embodiment even if the hub 5 is not provided. This is because the reflecting film 4 extends to the center hole and is in contact with a shaft that rotates the magneto-optical disk 9.

A third embodiment of the present invention is described hereinbelow, referring to FIG. 3.

In a magneto-optical disk 10 of the present embodiment, a magnetic film 2 and dielectric films 3 are provided closer to the outer section than the magnetic film 2 and the dielectric films 3 provided on the magneto-optical disk 9 of the second embodiment. That is, the magnetic film 2 and the dielectric films 3 are provided on the outer section lying beyond D shown in FIG. 3. These are sealed with a reflecting film 4 and a conductive film 11 extending to the inner-most section is provided above the reflecting film 4. A resin layer 6 and a lubricant layer 7 are provided on a section of the conductive film 11, excluding a section where the conductive film 11 is fitted to a hub 5.

Figure 3:
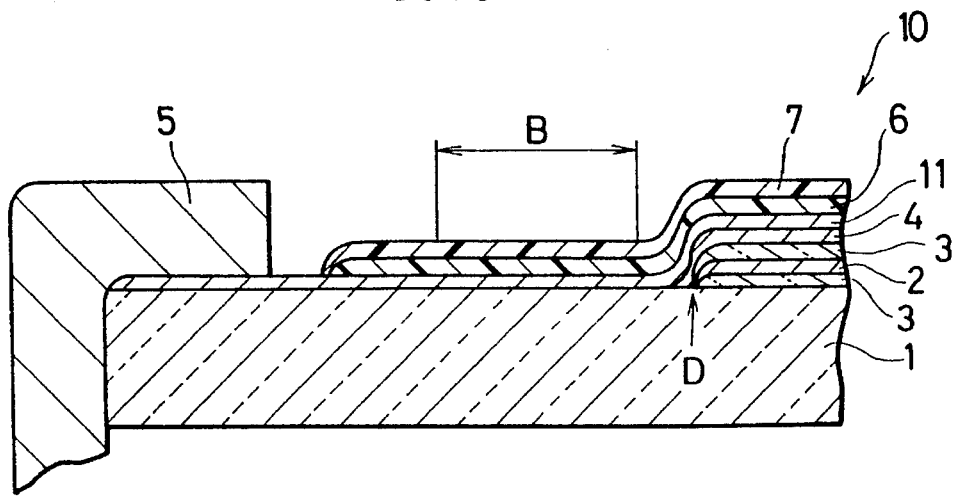
FIG. 3 shows a third embodiment of the present invention and is a partially sectional enlarged view of a magneto-optical disk.

According to the above arrangement, even if the lubricant layer 7 is damaged in the contact-start-and-stop zone indicated by B in FIG. 3 due to repeated contact-start-and-stop operations, the magnetic film 2 remains protected from direct exposure to air and corrosion. Reliability of the magneto-optical disk 10 thus increases.

Oxides such as $SnO_2$, $In_2O_3$, InSnO etc. may be used as the conductive film 11. Further, in the present embodiment the conductive film 11 has been provided as a conductive layer on the reflecting film 4, but the conductive layer may equally be incorporated within the reflecting film 4, as long as the reflecting film 4 possesses the property of low conductivity.

As described above, the magneto-optical recording medium related to the present invention includes a lubricant layer provided above the conductive layer.

Accordingly, since the flying head glides above and lands on the surface of the lubricant layer provided on the magneto-optical recording medium, the flying head does not adhere to the recording medium and the recording medium can easily be removed from the device. Further, the conductive layer provided on the substrate can be used to carry out stable recording of information by controlling the applied magnetic field to remain substantially constant according to the electrostatic capacity between the electrode on the bottom face of the flying head and the conductive layer.

If an organic binder containing a powder belonging to the ethylene tetrafluoride resin family is used as the lubricant layer, the lubricant is not scattered even when the magneto-optical recording medium is rotated at high speed and accumulation of dust on the recording medium is minimized.

The magnetic layer may be tightly sealed by the conductive layer so as to prevent exposure to air. In this case, the magnetic layer and the conductive layer need not be provided on an area of the magneto-optical recording medium where the flying head is in contact with the magneto-optical recording medium when rotation is started or stopped. Thus, stable recording of information may be performed since corrosion of the magnetic layer is prevented.

Further, the present invention has an advantage in that accumulation of dust due to static electricity is prevented since surface electrical resistance of the recording medium falls. This is especially convenient in the case of magneto-optical recording media that are unlike sealed media such as magnetic disks.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A magneto-optical recording medium whereon information is recorded using a flying head provided with an electrode and wherefrom information is reproduced magneto-optically, said magneto-optical recording medium comprising:

a transparent substrate including at least a transparent upper surface;

a magnetic layer for recording thereon information magneto-optically, said magnetic layer being disposed on said at least said transparent upper surface an electrically conductive layer having an electrical conductivity and being disposed over the entirety of said magnetic layer which is disposed on said at least said transparent upper surface on said transparent substrate, said electrically conductive layer being connected to ground when loading said magneto-optical recording medium;

a lubricating layer in contact with the flying head in stopping and starting rotations of said magneto-optical recording medium, said lubricating layer being provided on a side of said electrically conductive layer, opposite to a side of said transparent substrate.

2. A magneto-optical recording medium whereon information is recorded using a flying head provided with an electrode and wherefrom information is reproduced magneto-optically, said magneto-optical recording medium comprising:

a transparent substrate member;

a magnetic layer for recording thereon information magneto-optically, said magnetic layer being disposed on said transparent substrate member an electrically conductive layer having an electrical conductivity and being disposed over the entirety of said magnetic layer which is disposed on said transparent substrate member, said electrically conductive layer being connected to ground when loading said magneto-optical recording medium, said electrically conductive layer being formed so as to tightly seal the magnetic layer, thereby preventing the magnetic layer from being exposed to air;

a lubricating layer in contact with the flying head in stopping and starting rotations of said magneto-optical recording medium, said lubricating layer being provided on a side of said electrically conductive layer, opposite to a side of said transparent substrate member.

3. A magneto-optical recording medium whereon information is recorded using a flying head provided with an electrode and wherefrom information is reproduced magneto-optically, the recording medium comprising:

a transparent substrate member;

a magnetic layer member for recording thereon information magneto-optically, said magnetic layer being disposed on said transparent substrate member an electrically conductive layer having an electrical conductivity and being disposed over the entirety of said magnetic layer member which is disposed on said at least said transparent substrate member, said electrically conductive layer being connected to ground when loading said magneto-optical recording medium;

a reflecting layer member that reflects an optical beam projected thereon, said reflecting layer member being formed so as to tightly seal the magnetic layer member, thereby preventing the magnetic layer member from being exposed to air, said reflecting layer member being formed so as to tightly seal the electrically conductive layer, thereby preventing the electrically conductive layer from being exposed to air; and a lubricating layer in contact with the flying head in stopping and starting rotations of said magneto-optical recording medium, said lubricating layer being provided on a side of said electrically conductive layer, opposite to a side of said transparent substrate.

4. A method for processing a surface of a magneto-optical recording medium as defined in claim 3, the method comprising:

coating a resin on the surface of the magneto-optical recording medium, copying features of a stamper onto a surface of the resin, and subsequently, coating a lubricating layer onto the surface of the magneto-optical recording medium.

5. A method of recording information on a magneto-optical recording medium including:

a substrate member;

a magnetic layer for recording thereon information magneto-optically, said magnetic layer being disposed on said substrate member an electrically conductive layer having an electrical conductivity and being disposed over the entirety of said magnetic layer, said electrically conductive layer being connected to ground when loading said magneto-optical recording medium;

a lubricating layer in contact with the flying head in stopping and starting rotations of said magneto-optical recording medium, said lubricating layer being provided on a side of said electrically conductive layer, opposite to a side of said transparent substrate;

wherein said method involves using a flying head provided with an electrode, the flying head gliding above and landing on the lubricating layer, said method comprising the steps of:

detecting electrostatic capacity between the electrically conductive layer and the electrode of the flying head; and recording information magneto-optically onto the magnetic layer by maintaining a constant floating gap between the magneto-optical recording medium and the flying head so that a magnetic field intensity applied to the magneto-optical recording medium by a magnetic head which is a member of the flying head, the floating gap being maintained constant by controlling a depressing force exerted on the flying head according to detected electrostatic capacity.

6. A method of recording information on a magneto-optical recording medium including:

a substrate member;

a magnetic layer for recording thereon information magneto-optically, said magnetic layer being disposed on said substrate member an electrically conductive layer having an electrical conductivity and being disposed over the entirety of said magnetic layer, said electrically conductive layer being connected to ground when loading said magneto-optical recording medium;

a lubricating layer in contact with a flying head in stopping and starting rotations of said magneto-optical recording medium, said lubricating layer being provided on a side of said electrically conductive layer, opposite to a side of said transparent substrate;

wherein said method involves using said flying head having an electrode on a bottom surface thereof, the flying head gliding above and landing on the lubricating layer, said method comprising the steps of:

detecting electrostatic capacity between the conductive layer and the electrode of the flying head; and recording information magneto-optically onto the magnetic layer by controlling a driving current applied to the magnetic head according to detected electrostatic capacity so that a magnetic field intensity applied onto the magneto-optical recording medium by a magnetic head, which is a member of the flying head, remains constant.

* * * * *